United States Patent
Martus et al.

[11] Patent Number: 6,050,623
[45] Date of Patent: Apr. 18, 2000

[54] LATCHBOLT ASSEMBLY AND METHOD OF SEALING SAME

[75] Inventors: Charles R. Martus, Oxford; Charles A. Detweiler, Durand, both of Mich.

[73] Assignee: Lectron Products, Inc. (a subsidiary of Eaton Corporation), Cleveland, Ohio

[21] Appl. No.: 08/989,145

[22] Filed: Dec. 11, 1997

[51] Int. Cl.[7] .................................................. E05B 9/00
[52] U.S. Cl. ........................................ 292/337; 292/171
[58] Field of Search ...................................... 292/337, 171, 292/341.18, DIG. 69; 296/97.22

[56] References Cited

U.S. PATENT DOCUMENTS

| | | | |
|---|---|---|---|
| 2,532,630 | 12/1950 | Lickteig | 292/337 |
| 3,955,837 | 5/1976 | Christensen | 292/173 |
| 4,525,004 | 6/1985 | Tanaka | 292/337 |
| 4,691,948 | 9/1987 | Austin, Jr. et al. | 292/144 |
| 4,917,418 | 4/1990 | Gokee | 292/171 |
| 5,044,678 | 9/1991 | Detweiler | 292/144 |
| 5,048,878 | 9/1991 | Takeshita et al. | 292/171 |
| 5,076,622 | 12/1991 | Detweiler | 292/201 |
| 5,094,488 | 3/1992 | Boadwine et al. | 292/337 |
| 5,419,166 | 5/1995 | Helman | 70/62 |
| 5,664,811 | 9/1997 | Martus et al. | 292/144 |

*Primary Examiner*—Teri Pham
*Attorney, Agent, or Firm*—Roger A. Johnston

[57] ABSTRACT

A latchbolt assembly having a carrier with a solenoid operator mounted on the carrier is slidably received in a base or mounting cap with an annular groove formed in the carrier with a projection formed in the groove at a vertically downward location. A split ring is received in the groove with the projection orienting the gaps in the split ring and the split ring is compressed radially for sealing between the carrier and a base. A latchbolt is slidably received in the carrier and is connected to the solenoid armature for movement to the unlocking position upon energization of the solenoid. A cable extends through the housing and armature and is connected to the latchbolt for manual retraction by the user pulling on the cable. The latchbolt assembly is particularly suitable for motor vehicle fuel filler door latching applications.

5 Claims, 2 Drawing Sheets

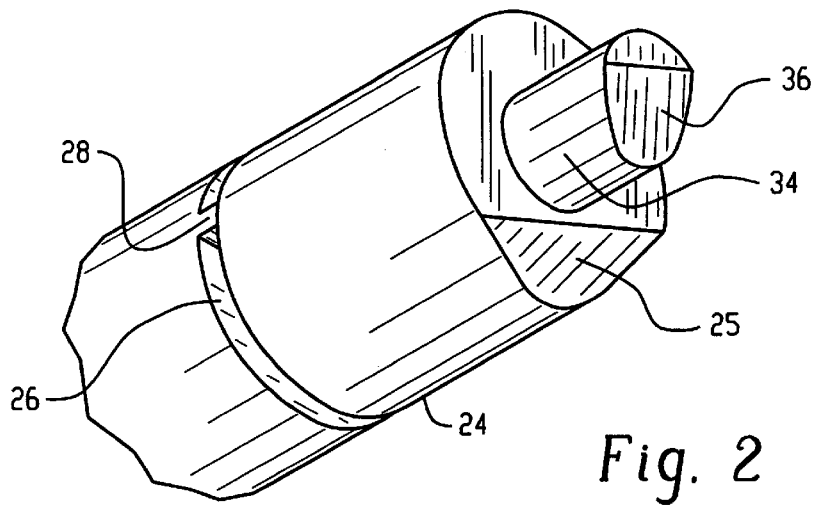
Fig. 2
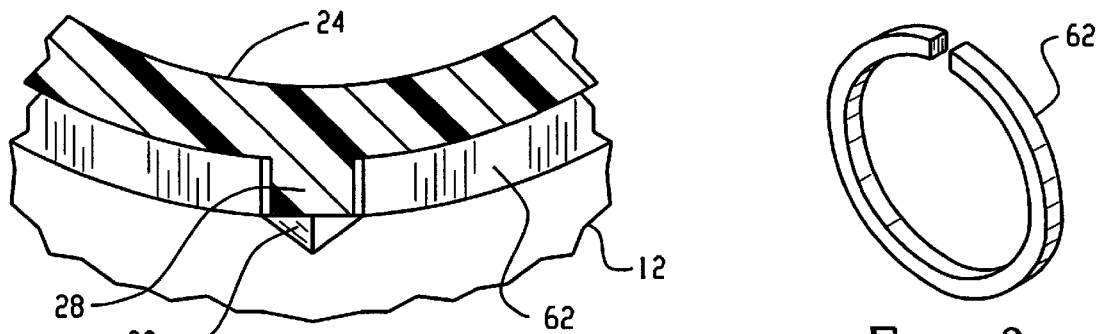
Fig. 5
Fig. 3
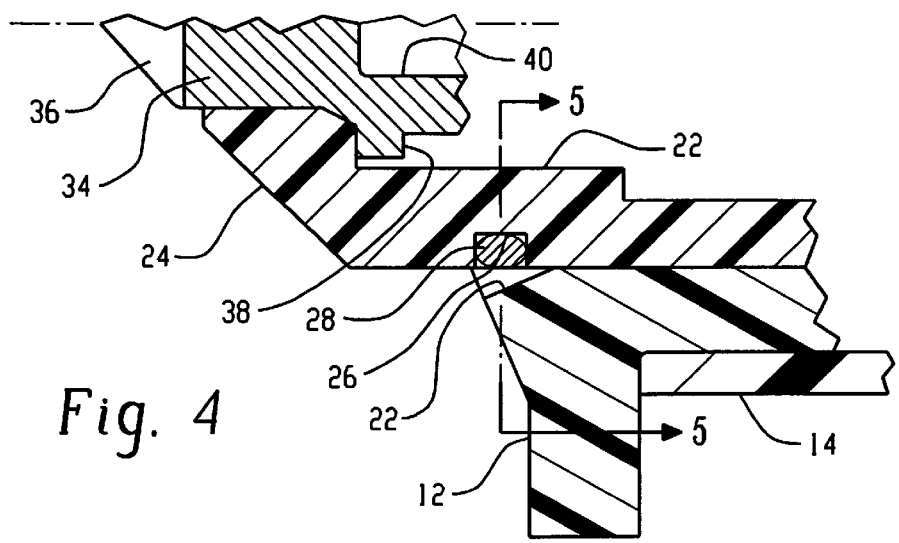
Fig. 4

LATCHBOLT ASSEMBLY AND METHOD OF SEALING SAME

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to remotely operated latchbolt mechanisms for locking and unlocking a fuel filler access door in a motor vehicle. Currently, it has been a popular accessory for a passenger car to provide for remotely operated locking and unlocking of the fuel filler access door and particularly to provide a solenoid operated latching mechanism that may be remotely energized for unlocking the fuel filler access door from the driver's position in the passenger compartment. Typically, the latching mechanism extends through an aperture in a well or recessed structure disposed on the inner surface of the vehicle body side with the fuel tank filler neck and cap extending into the well. An access doorway is provided in the vehicle body side; and, it is this doorway that is provided with a filler access door for closure. The latching mechanism typically extends into the vehicle trunk or luggage compartment when attached to the filler access well. This arrangement has proven to be troublesome in that it has been difficult to provide a water tight seal about the latching mechanism to prevent water from leaking around the mechanism and into the trunk or between a latch bolt and the carrier or plunger of the latching mechanism which supports the latchbolt.

It has thus been desired to provide a simple, effective and low-cost way or means of sealing the electrically controlled latching mechanism for an automotive fuel filler access door in a way which is reliable and easily installed during vehicle assembly.

BRIEF SUMMARY OF THE INVENTION

The present invention provides a unique and novel electrically operated latchbolt assembly for an automotive fuel filler access door having the carrier or plunger with the latchbolt slidably mounted therein. The latchbolt carrier is grooved annularly with a split ring received in the groove and radially compressed to provide a sliding seal between the carrier and the base or mounting cap for the assembly. The groove in the carrier has a lug or projection formed therein which is oriented to extend downwardly at assembly into the vehicle; and, the gap in the split ring is engaged by the lug to orient the gap in the ring downwardly. A drainage slot provided in the base or mounting cap is oriented to coincide with the gap in the split ring and the slot is oriented so that any moisture or liquid will drain away from the interior of the latching assembly. Optionally, the latchbolt may be grooved annularly with a split-type sealing ring provided therein for providing a sliding seal between the latchbolt and the carrier.

The present invention thus provides a novel and cost-effective way of sealing a fuel filler access door latching mechanism to prevent moisture from entering the interior of the body or the vehicle luggage compartment.

BRIEF DESCRIPTION OF THE DRAWINGS

FIG. 2 is a perspective view of the end portion of the carrier or plunger of the assembly of FIG. 1;

FIG. 3 is a perspective view of the split ring of the assembly of FIG. 1;

FIG. 4 is a portion of a section view taken along section indicating line 4—4 of FIG. 1; and, FIG. 5 is a portion of a section view taken along section indicating line 5—5 of FIG. 4.

DETAILED DESCRIPTION OF THE INVENTION

Figure 1:
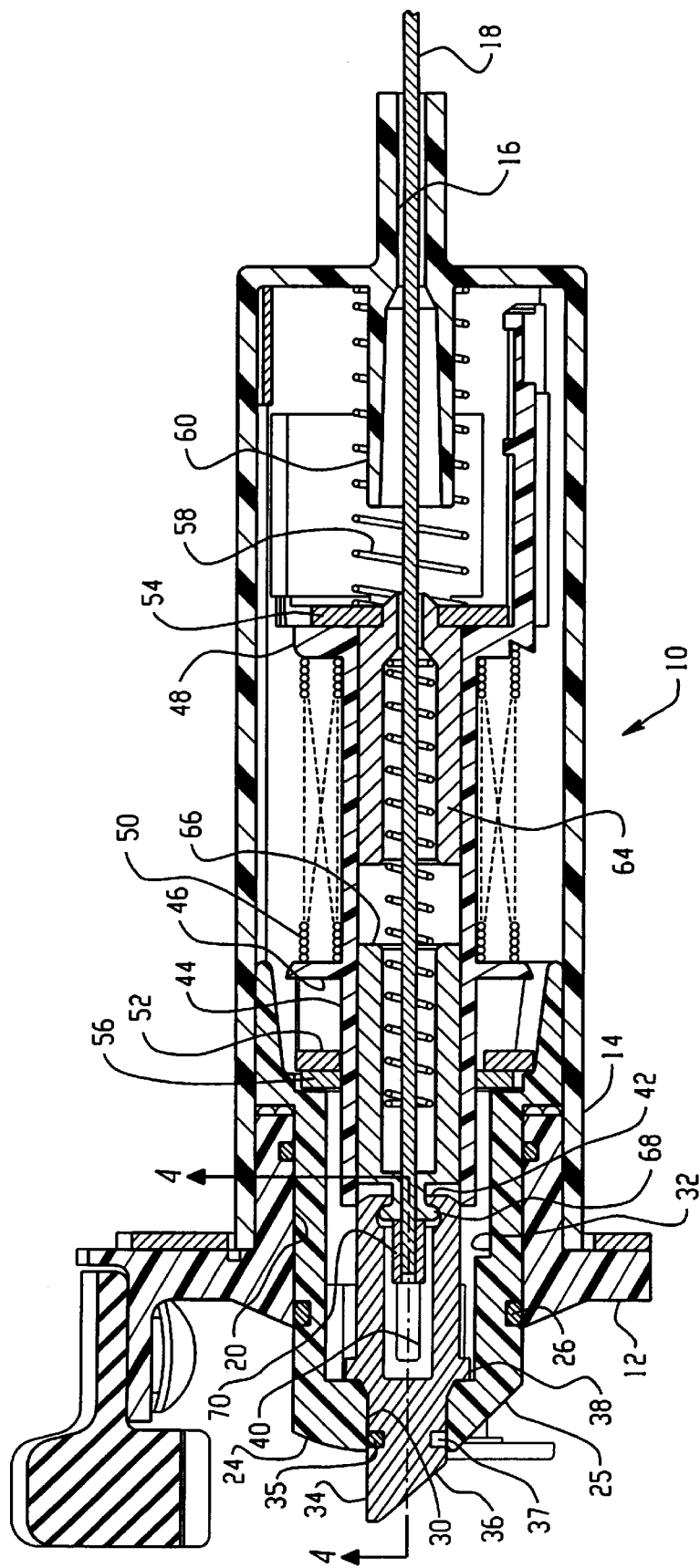
FIG. 1 is a longitudinal cross-section of the latching assembly of the present invention.

Referring to FIGS. 1 and 4, the assembly of the present invention is indicated generally at 10 and has a base or mounting cap 12 to which is attached a housing or cover shell 14 which has an opening 16 formed in one end thereof through which is received a manually actuatable cable 18. The base or cap 12 has an aperture or bore 20 formed therein and which has at the bottom or lower edge thereof a drainage slot 22 formed therein at the exterior edge of the aperture 20. It will be understood that the slot 22 is located in the 6 o'clock or vertically downward position with respect to the orientation of the base. The slot 22 functions to cause any moisture or water entering the outer edge of the bore 20 to drain outwardly from the bore.

A carrier or plunger 24 is slidably received in the bore 20 and the plunger has an annular groove formed peripherally thereabout as denoted by reference numeral 26 in FIGS. 1 and 2.

The groove 26 has a lug or projection 28 formed therein at the six o'clock or vertically downward position which lug is intended to be oriented to coincide with the location of the drain slot 22 upon assembly of the plunger 24 into the base 12.

The plunger or carrier 24 has a bore 30 in the end thereof which opens to an enlarged diameter or counterbore 32 extending through the plunger 24 to the end thereof opposite bore 30.

A latchbolt 34 is slidably received in the bore 30 and has a striking surface or chamfer 36 formed on the outer end thereof with an annular flange 38 formed thereon which flange extends into the counterbore 32 to limit the outward travel or movement in a leftward direction with respect to FIG. 1 of the bolt 34. Bolt 34 has a blind bore 40 formed therein in the interior or right hand end thereof, which bore is undercut internally to form a flange 42 on the end of the bolt.

A coil bobbin 44 is received within the housing 14 and has a pair of annular radially outwardly extending flanges 46, 48 between which flanges a coil 50 of electrically conductive wire is wound thereon for forming a solenoid. A generally U-shaped pole frame is received around the coil and the end flanges of the pole frame are shown in FIG. 1 and denoted by reference numerals 52, 54, it being understood that the portion of the pole frame interconnecting flanges 52, 54 is hidden by the coil in FIG. 1.

The pole frame flange 52 has a spacer washer 56 disposed adjacent the outer or leftward face thereof which spaces the pole frame from the end of the counter bore 32 in the plunger. The pole frame and bobbin are biased in a leftward direction by a spring 58 disposed within the housing with one end thereof registered over a spring pilot 60 provided in the housing 14 adjacent the hole 16.

The plunger 24 has a striking or camming surface in the form of a chamfer 25 formed on the end extending outwardly of bore 30.

Referring to FIGS. 1 through 5, a split ring 62 having a gap between the ends thereof is received in groove 26 of the plunger with the gap between the ends oriented on either side of the lug or projection 28 and oriented to align with the drain slot 22 as shown in FIG. 5. In the presently preferred practice of the invention the split ring is formed of acetyl resin plastic material, however, other suitable materials having a relatively low coefficient of friction may be used. The ring 62 is radially compressed when inserted into the bore 20 to provide a wiping seal thereagainst. It will be understood that the axial width of the ring 62 is a close fit in the groove 26; and, the gap between the end of the split ring is sufficient that when the ring is inserted in the bore 20, the ends of the ring 62 closely inter fit but are not pressed against the sides of the lug 28. Thus the inherent elasticity of the ring in the radial direction provides the sealing forces. Optionally a second annular groove 35 may be provided in latchbolt 34 and a second split ring 37 provided therein for providing a seal between latchbolt 24 and carrier 24.

Referring to FIG. 1, the bobbin has a stationary pole piece or flux collector 64 disposed therein which is in registration with the end flange 54 of the U-shaped pole frame. A moveable armature 66 is slidably received in the interior of the bobbin and has an annular flange 68 formed on the end thereof opposite the flux collector 64; and, the flange 68 engages the flange 42 formed on the end of the bolt 34. Thus, movement of the armature effects movement of the bolt. The armature 66 is spaced axially from the flux collector 64 to provide an air gap which comprises the stroke of the armature upon energization of coil 50. Thus, upon energization of the coil 50, the armature is moved rightward from the position shown in FIG. 1 to retract the bolt extension 34 from engagement with a suitable striker (not shown) on a door to be unlatched.

Cable 18 extends through the center of flux collector 64 and armature 66 in free sliding engagement and through the flange 68 on the end of the armature. A fastening means comprising a crimped ferrule 70 is provided on the end of the cable and is registered against the end of the flange 68 upon the user moving the cable 18 in a rightward direction. Thus, in the event the solenoid is unable to move the armature and bolt, the user may pull on cable 18 and effect movement of the armature and bolt manually.

The present invention thus provides a cost effective way of sealing an electrically operated latching bolt assembly from moisture and water entering the moveable plunger particularly where the latching assembly is mounted through a partition or bulkhead such as for latching a fuel filler access door in a motor vehicle. The latching bolt assembly includes a split ring received in an annular groove on the plunger or carrier containing the bolt. A projection in the groove orients the gap in the ring vertically downward such that moisture or water entering between the plunger and the housing is drained by a drain slot through the exterior side of the bulkhead or partition.

Although the invention has hereinabove been described with respect to the illustrated embodiments, it will be understood that the invention is capable of modification and variation and is limited only by the following claims.

We claim:

1. A method of sealing a latch bolt comprising:
    (a) providing a housing and forming a drain therein;
    (b) slidably disposing a carrier in said housing;
    (c) disposing a split ring having a gap between said carrier and said housing
    (d) forming a projection on said carrier and orientating said carrier such that said projection engages said gap;
    (e) aligning said gap with said drain and compressing said split ring and sealing therebetween; and
    (f) slidably disposing a latch bolt in said carrier and disposing a sealing ring therebetween.

2. The method defined in claim 1 wherein said step of disposing a split ring includes forming a peripheral groove in said carrier and assembling said split ring in said groove.

3. A latchbolt assembly for installation in a vehicle fuel filler well for latching a door associated therewith comprising:
    (a) a housing defining a drain adapted for mounting in said well;
    (b) a carrier slidably received in said housing, said carrier having an orienting projection thereon;
    (c) a latchbolt having a latching surface thereon slidably received in said carrier and moveable between a first position for engaging and a second position for disengaging said door;
    (d) a split sealing ring disposed between said carrier and said housing and radially compressed therein said split ring having a gap therein oriented with said drain, wherein said carrier projection is disposed in said gap for orienting said latchbolt latching surface.

4. The assembly defined in claim 3 further comprising electromagnetic means operable upon electrical energization for moving said latchbolt to said second position for disengaging.

5. The assembly defined in claim 3, wherein said split ring is formed of plastic material.

* * * * *